J. H. HARPER.
Portable Furnace.
No. 97,634.
Patented Dec. 7, 1869.
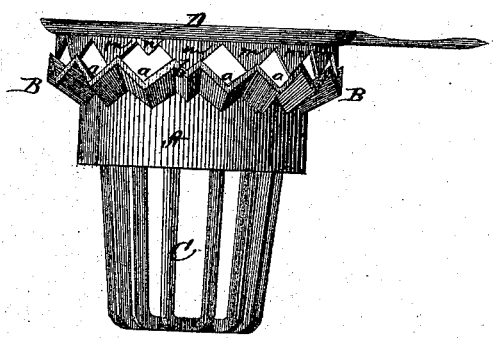
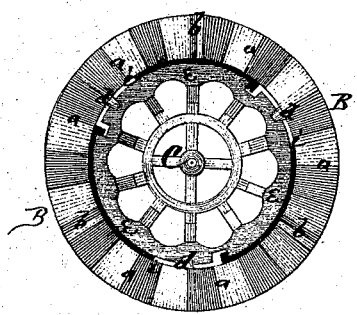

United States Patent Office.

JOHN H. HARPER, OF PITTSBURG, PENNSYLVANIA.

Letters Patent No. 97,634, dated December 7, 1869.

---

PORTABLE FURNACE.

---

The Schedule referred to in these Letters Patent and making part of the same.

---

*To all whom it may concern:*

Be it known that I, JOHN H. HARPER, of Pittsburg, in the county of Allegheny, and in the State of Pennsylvania, have invented certain new and useful Improvements in Cooking-Attachment for Stoves; and do hereby declare that the following is a full, clear, and exact description thereof, reference being had to the accompanying drawings, and to the letters of reference marked thereon, making a part of this specification.

The nature of my invention consists in the construction and arrangement of a "cooking-attachment for stoves," by the use of which fire may be made under one hole of the stove only, if so desired.

In order to enable others skilled in the art to which my invention appertains, to make and use the same, I will now proceed to describe its construction and operation, referring to the annexed drawings, in which—

Figure 1 is a side elevation, and
Figure 2 is a plan view.

A represents a collar, provided with a rim, B, which is to be placed in one of the holes of any cooking-stove, the rim resting upon the stove.

The rim B is of zigzag form, forming V-shaped recesses $a$ $a$ along its entire upper surface, being all of the same size, and at equal distances apart, with the exception that at equal distances apart are formed three smaller recesses $b$ $b$, for a purpose that will be hereinafter set forth.

Within the collar A, at its lower edge, are three projecting flanges $i$ $i$, and in the centre of the spaces between said flanges are placed vertical ribs $d$ $d$, which extend upward to the upper edge of the rim B.

The grate C is in the form of a basket, with horizontal rim $e$ around its upper edge, said rim being of proper size to fit within the collar A.

In the rim $e$ are three notches, of suitable size, and at equal distances apart, so that when the grate is passed downward from the top of the collar A, the ribs $d$ $d$ will pass through said notches, and the rim at last rest upon the flanges $i$ $i$, when the grate may be turned, so that the ribs $d$ $d$ will come over the rim, and consequently lock the grate.

The griddle or lid D is made to fit on top of the rim B, and provided on the under side with a series of zigzag teeth, $m$ $m$, of suitable size to fit within the recesses $a$ $a$ on the rim, and also with three smaller teeth $n$ $n$, at proper distances apart to fit within the smaller recesses $b$ $b$.

The lid D acts as a damper, and when turned to one side, so that the larger teeth $m$ rest in the smaller recesses $b$, as shown in fig. 1, it will leave an air-space to feed the fire.

The collar A need not, as above described, necessarily fit within the stove-hole. It may rest upon the stove, only so that the grate fits within the hole.

Any kettle or other vessel may be placed upon the zigzag rim B, and give sufficient air-space to supply the fire.

The ribs $d$ $d$ answer, also, for the purpose of supporting a smaller vessel, so that it may not come down within the collar, and put out the fire.

The advantages of this cooking-attachment are obvious. When it is desired to cook only for one or two persons, it will not be necessary to make fire in the whole stove, but just in one hole, and thus save fuel, besides the discomfort of having too warm a fire in hot weather.

Having thus fully described my invention,
What I claim as new, and desire to secure by Letters Patent, is—

1. The collar A, provided with the zigzag rim B, constructed as described, substantially as and for the purposes herein set forth.

2. The griddle or lid D, provided with depending flange, having projections $m$ $m$ and $n$ $n$, constructed as described, substantially as and for the purposes herein set forth.

3. The ribs $d$ $d$, placed vertically within the collar A, substantially as and for the purposes herein set forth.

4. The combination of the collar A, zigzag rim B, flanges $i$ $i$, ribs $d$ $d$, grate C, notched rim $e$, and griddle or lid D, provided with zigzag teeth, all substantially as and for the purposes herein set forth.

In testimony that I claim the foregoing, I have hereunto set my hand, this 26th day of October, 1869.

JOHN H. HARPER.

Witnesses:
EB. WILLIAMS, Jr.,
SETH WILMOT.